(12) United States Patent
Boisson et al.

(10) Patent No.: US 10,902,624 B2
(45) Date of Patent: Jan. 26, 2021

(54) APPARATUS AND A METHOD FOR GENERATING DATA REPRESENTING A PIXEL BEAM

(71) Applicant: THOMSON Licensing, Issy-les-Moulineaux (FR)

(72) Inventors: Guillaume Boisson, Pleumeleuc (FR); Arno Schubert, Chevaigne (FR); Laurent Blonde, Thorigné-Fouillard (FR)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 381 days.

(21) Appl. No.: 15/761,090

(22) PCT Filed: Sep. 16, 2016

(86) PCT No.: PCT/EP2016/072068
§ 371 (c)(1),
(2) Date: Mar. 17, 2018

(87) PCT Pub. No.: WO2017/046393
PCT Pub. Date: Mar. 23, 2017

(65) Prior Publication Data
US 2018/0260969 A1    Sep. 13, 2018

(30) Foreign Application Priority Data

Sep. 17, 2015 (EP) .................................. 15306445

(51) Int. Cl.
*G06T 7/557* (2017.01)
*H04N 5/225* (2006.01)
(Continued)

(52) U.S. Cl.
CPC ............... *G06T 7/557* (2017.01); *G06T 7/62* (2017.01); *H04N 5/225* (2013.01); *H04N 13/232* (2018.05); *G06T 2207/10052* (2013.01)

(58) Field of Classification Search
CPC . G06T 7/557; G06T 7/62; G06T 2207/10052; H04N 5/225; H04N 13/232
See application file for complete search history.

(56) References Cited

U.S. PATENT DOCUMENTS

| 8,902,284 B2 | 12/2014 | Ijzerman et al. |
| 9,456,118 B2 | 9/2016 | Nagano et al. |

(Continued)

FOREIGN PATENT DOCUMENTS

| AU | 2008246243 | 6/2010 |
| CN | 103913807 A | 7/2014 |

(Continued)

OTHER PUBLICATIONS

Anonymous, "Light Field", Wikipedia, the free encyclopedia, http://en.wikipedia.org/wiki/Light_field, Dec. 5, 2015, pp. 1-6.

(Continued)

*Primary Examiner* — Timothy J Henn
(74) *Attorney, Agent, or Firm* — Robert D. Shedd (57) ABSTRACT

There are several types of plenoptic devices and camera arrays available on the market, and all these light field acquisition devices have their proprietary file format. However, there is no standard supporting the acquisition and transmission of multi-dimensional information. It is interesting to obtain information related to a correspondence between pixels of a sensor of said optical acquisition system and an object space of said optical acquisition system. Indeed, knowing which portion of the object space of an optical acquisition system a pixel belonging to the sensor of said optical acquisition system is sensing enables the (Continued)

improvement of signal processing operations. The notion of pixel beam, which represents a volume occupied by a set of rays of light in an object space of an optical system of a camera is thus introduce.

13 Claims, 6 Drawing Sheets

(51) Int. Cl.
*H04N 13/232* (2018.01)
*G06T 7/62* (2017.01)

(56) References Cited

U.S. PATENT DOCUMENTS

| | | | | |
|---|---|---|---|---|
| 2007/0252074 | A1* | 11/2007 | Ng | G02B 27/0075 250/208.1 |
| 2008/0152215 | A1 | 6/2008 | Horie et al. | |
| 2010/0026538 | A1 | 2/2010 | Herr et al. | |
| 2010/0142839 | A1 | 6/2010 | Lakus-Becker | |
| 2010/0265385 | A1* | 10/2010 | Knight | H04N 9/8205 348/340 |
| 2011/0211088 | A1 | 9/2011 | Kishine et al. | |
| 2013/0113981 | A1 | 5/2013 | Knight et al. | |
| 2013/0023526 | A1 | 9/2013 | Berkner et al. | |
| 2014/0098191 | A1 | 4/2014 | Rime et al. | |
| 2014/0176592 | A1* | 6/2014 | Wilburn | H04N 5/23212 345/589 |
| 2014/0181630 | A1 | 6/2014 | Monney et al. | |
| 2014/0328535 | A1* | 11/2014 | Sorkine-Hornung | G06T 5/00 382/154 |
| 2014/0369594 | A1 | 12/2014 | Ghasemi et al. | |
| 2015/0003752 | A1* | 1/2015 | Venkataraman | G06T 9/20 382/233 |
| 2015/0117756 | A1 | 4/2015 | Tosic et al. | |
| 2015/0264268 | A1* | 9/2015 | Aiba | G02B 6/29334 348/333.02 |
| 2017/0085832 | A1* | 3/2017 | Drazic | H04N 5/9201 |
| 2018/0047185 | A1* | 2/2018 | Boisson | H04N 13/282 |
| 2018/0252928 | A1* | 9/2018 | Blonde | G02B 27/0075 |
| 2018/0260968 | A1* | 9/2018 | Drazic | G06T 7/557 |
| 2018/0260977 | A1* | 9/2018 | Blonde | H04N 19/597 |
| 2018/0262776 | A1* | 9/2018 | Seifi | H04N 19/60 |

FOREIGN PATENT DOCUMENTS

| | | |
|---|---|---|
| CN | 104284083 A | 1/2015 |
| CN | 104303493 A | 1/2015 |
| JP | 2013115717 A | 2/2010 |
| JP | 2010176325 A | 8/2010 |
| JP | 2012524467 A | 10/2012 |
| JP | 2013165475 A | 8/2013 |
| JP | 2013187914 A | 9/2013 |
| RU | 2549169 C2 | 4/2015 |
| WO | WO2010120591 | 10/2010 |

OTHER PUBLICATIONS

Levin et al., "Understanding camera trade-offs through a Bayesian analysis of light field projections", 10th European Conference on Computer Vision (ECCV), Marseille, France, Oct. 12, 2008, pp. 88-101.

Park et al., "Light ray field capture using focal plane sweeping and its optical reconstruction using 3D displays", Optics Express, vol. 22, No. 21, Oct. 20, 2014, pp. 25444-25454.

Ng, R., "Digital Light Field Photography", Stanford University, Department of Computer Science, Doctoral Dissertation, Jul. 2006, pp. 1-203.

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

* cited by examiner

APPARATUS AND A METHOD FOR GENERATING DATA REPRESENTING A PIXEL BEAM

This application claims the benefit of International Application PCT/EP2016/072068, under 35 U.S.C. § 365, filed on Sep. 16, 2016, which was published in accordance with Article 21(2) on Mar. 23, 2017, in English, and which claims the benefit of European Patent Application No. 15306445.6, filed on Sep. 17, 2015.

TECHNICAL FIELD

The present invention relates to generation of data representing a light field.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Figure 1A:
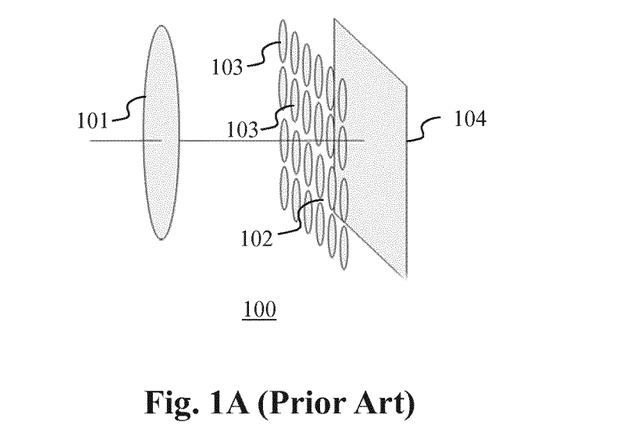
FIG. 1A is a diagram schematically representing a plenoptic camera.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. Details of the architecture of a plenoptic camera are provided in FIG. 1A. FIG. 1A is a diagram schematically representing a plenoptic camera 100. The plenoptic camera 100 comprises a main lens 101, a micro-lens array 102 comprising a plurality of micro-lenses 103 arranged in a two-dimensional array and an image sensor 104.

Figure 1B:
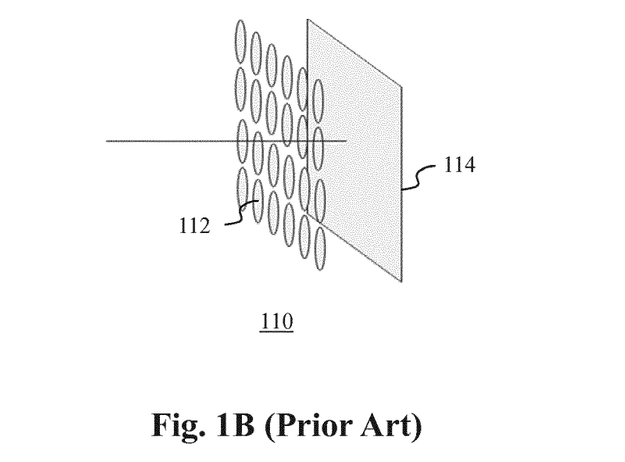
FIG. 1B represents a multi-array camera.

Another way to acquire 4D light-field data is to use a camera array as depicted in FIG. 1B. FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph.D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

There are several types of plenoptic devices and camera arrays available on the market, and all these light field acquisition devices have their proprietary file format. Thus it appears that light-field technology cannot live besides regular 2D or 3D imaging as there is no standard supporting the acquisition and transmission of multi-dimensional information. The present invention has been devised with the foregoing in mind.

SUMMARY OF INVENTION

According to a first aspect of the invention there is provided a computer implemented generating data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, the method comprising generating a digital file comprising data representative of said pixel beam, said data comprising:

parameters defining said pupil of the optical acquisition device, parameters defining the smallest section of said pixel beam, called the waist, which corresponds to the conjugate, in the object space, of at least said pixel of the sensor, wherein said parameters defining the waist of said pixel beam are computed based on parameters defining said at least one pixel.

According to an embodiment of the invention, parameters representing an intensity of the light captured by said pixel obtained from light field data captured by the optical acquisition system, are associated to the parameters representative of the pixel beam in said digital file.

According to an embodiment of the invention, the parameters defining the pupil comprise a radius of the pupil, coordinates of the pupil centre in a coordinate system associated to the optical acquisition system, and angles defining an orientation of the pupil in said coordinate system.

According to an embodiment of the invention, the parameters representing the waist of the pixel beam comprise a distance between the waist of the pixel beam and the centre of the pupil, an orientation of the waist of the pixel beam in the coordinate system.

Another object of the invention concerns an apparatus for generating data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, the apparatus comprising a processor configured to generate a digital file comprising data representative of said pixel beam, said data comprising:

parameters defining said pupil of the optical acquisition device, parameters defining the smallest section of said pixel beam, called the waist, which corresponds to the conjugate, in the object space, of at least said pixel of the sensor, wherein said parameters defining the waist of said pixel beam are computed based on parameters defining said at least one pixel.

According to an embodiment of the invention, parameters representing an intensity of the light captured by said pixel obtained from light field data captured by the optical acquisition device, are associated to the parameters representative of the pixel beam in the digital file.

According to an embodiment of the invention, the parameters defining the pupil comprise a radius of the pupil, coordinates of the pupil centre in a coordinate system associated to the optical acquisition device, and angles defining an orientation of the pupil in said coordinate system.

Another objet of the invention concerns a light field imaging device comprising:

an array of micro lenses arranged in a regular lattice structure;

a photosensor configured to capture light projected on the photosensor from the array of micro lenses, the photosensor comprising sets of pixels, each set of pixels being optically associated with a respective micro lens of the array of micro lenses; and a device for providing a digital file comprising data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam in accordance with claim 5.

Another objet of the invention concerns a device for rendering an image from light field data using a digital file comprising data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam obtained in accordance with the method of any one of claims 1 to 4.

Another objet of the invention concerns a digital file comprising data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam said data comprising:

parameters defining said pupil of the optical acquisition device, parameters defining the smallest section of said pixel beam, called the waist, which corresponds to the conjugate, in the object space, of at least said pixel of the sensor, wherein said parameters defining the waist of said pixel beam are computed based on parameters defining said at least one pixel, and an intensity of the light captured by said pixel obtained from light field data captured by the optical acquisition system.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 2:
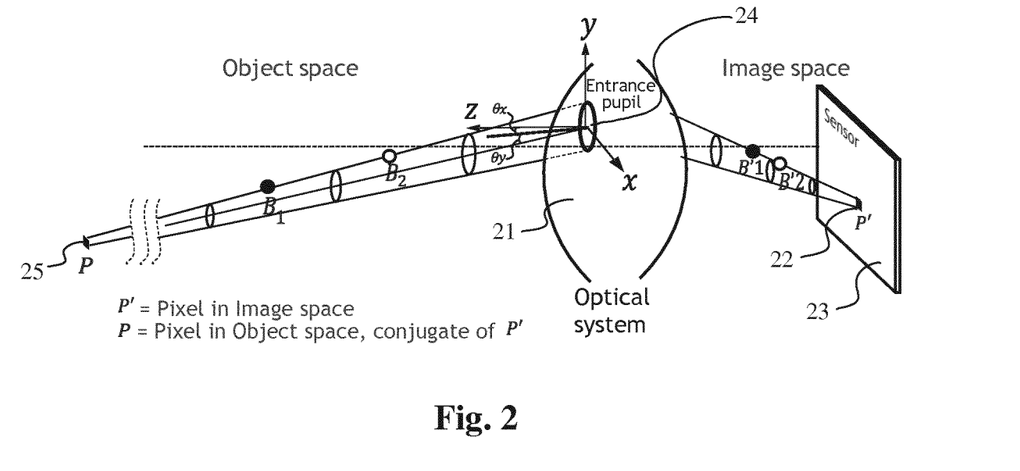
FIG. 2 represents a volume occupied by a set of rays of light in an object space of an optical system of a camera or optical acquisition system.

The present disclosure introduces the notion of pixel beam 10, shown on FIG. 2, which represents a volume occupied by a set of rays of light in an object space of an optical system 11 of a camera or optical acquisition system (not shown on FIG. 2). The set of rays of light is sensed by a pixel 22 of a sensor 23 of the camera through a pupil 24 of said optical system 21. The optical system 21 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may be adapted depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

A pixel beam 10 is defined as a pencil of rays of light that reach a given pixel 22 when propagating through the optical system 21 via an entrance pupil 24. As light travels on straight lines in free space, the shape of such a pixel beam 20 can be defined by two sections, one being the conjugate 25 of the pixel 22, and the other being the entrance pupil 24. The pixel 22 is defined by its non-null surface and its sensitivity map.

Figure 3:
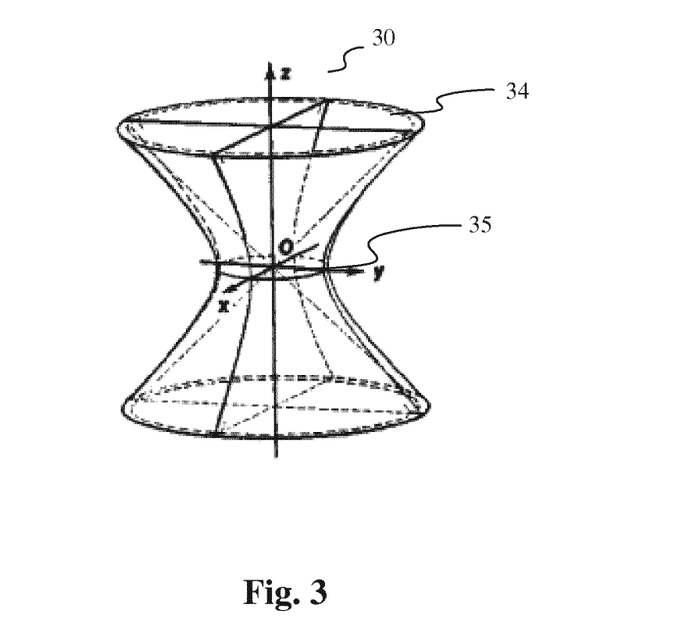
FIG. 3 represents a hyperboloid of one sheet.

Thus, a pixel beam 30 may be represented by an hyperboloid of one sheet, as shown on FIG. 3, supported by two elements: the pupil 34 and the conjugate 35 of the pixel 22 in the object space.

A hyperboloid of one sheet is a ruled surface that can support the notion of pencil of rays of light and is compatible with the notion of "étendue" of physical light beams, notion linked to the preservation of energy across sections of the physical light beams.

A hyperboloid of one sheet corresponds to the geometry of a Gaussian beam. Indeed, in optics, a Gaussian beam is a beam of monochromatic electromagnetic radiation whose transverse magnetic and electric field amplitude profiles are given by a Gaussian function; this also implies a Gaussian intensity profile. This fundamental transverse Gaussian mode describes an intended output of most lasers, since such a beam of light can be focused into the most concentrated spot.

The equations below assume a beam with a circular cross-section at all values of z this can be seen by noting that a single transverse dimension, r, appears.

At a position z along the beam (measured from the focus), the spot size parameter w is given by[1]

$$w(z) = w_0 \sqrt{1 + \left(\frac{z}{z_R}\right)^2}$$

where $w_0$ is the waist size.

Figure 10:
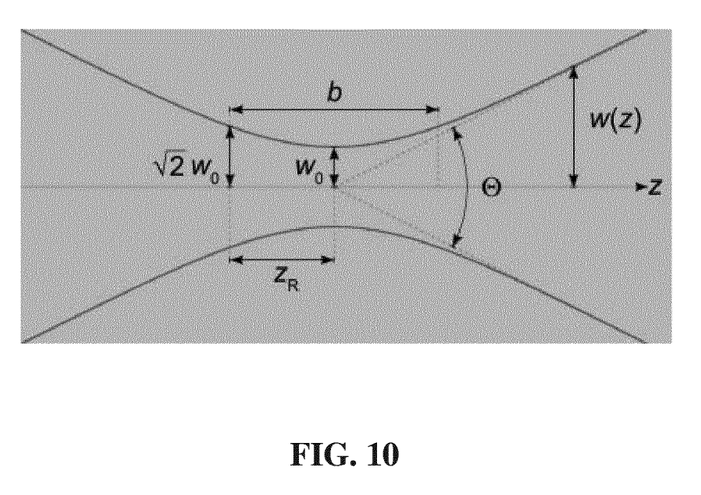
FIG. 10 represents the geometric shape of a Gaussian beam

As represented on FIG. 10, at a distance from the waist equal to $z_R$, the width w of the beam is equal to $\sqrt{2}w_0$.

Although the tails of a Gaussian function never actually reach zero, for. This means that far from the waist, the beam "edge" is cone-shaped. The angle between lines along that cone (whose r=w(z)) and the central axis of the beam (r=0) is called the divergence of the beam.

The total angular spread of the beam far from the waist is then given by $\Theta=2\theta$.

Figure 4:
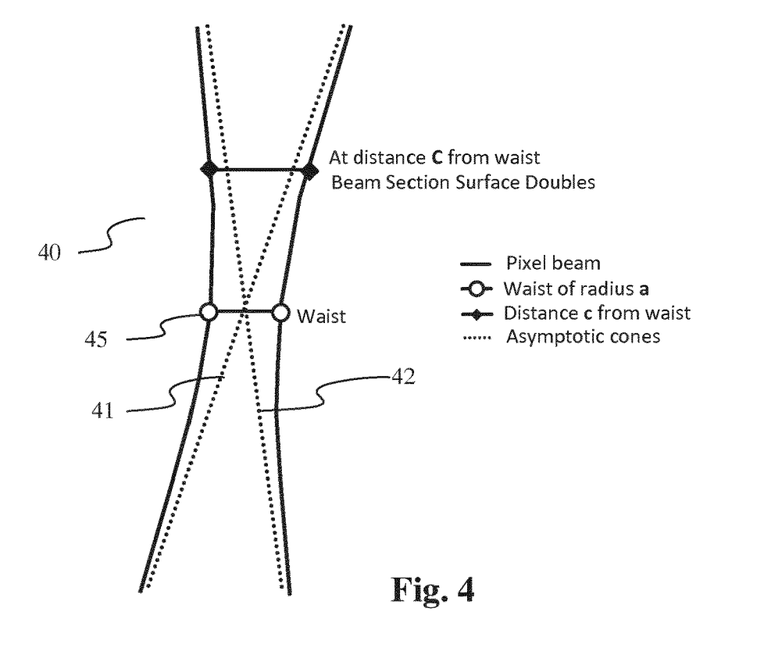
FIG. 4 represents another view of a hyperboloid of one sheet.

As represented on FIG. 4, a hyperboloid of one sheet 40 is mostly identical to its asymptotic cones 41, 42, except in the fundamental region of its smallest section, called the waist 45, which corresponds to the conjugate 25 in the object space. For plenoptic systems, such as light-field cameras, this is the region where space sampling by multiple path rays is performed. Sampling space with cones in this region is not adequate, as pixel 22 sensitivity is significant on some tens of square microns on its surface and cannot be represented by a mathematical point with infinitely small surface as would be a cone tip.

In a first embodiment of the invention, each pixel beam 20, 30, 40, is defined by four parameters: $z_P$, $\theta_x$, $\theta_y$, a defining the position and size of the pixel conjugate 25, 45, in front of the pupil 24, 34 and by six pupilar parameters $x_O$, $y_O$, $z_O$, $\theta_{xO}$, $\theta_{yO}$, r which define the position, orientation and radius of the pupil 24, 34. These six pupilar parameters are common to the collection of pixel beams sharing a same pupil 24, 34. Indeed, a pixel beam represents the volume occupied by a set of rays of light in the object space of the optical system 21 sensed by the pixel 22 through the pupil 24, i.e. to a given couple pixel 22/pupil 24, 34 corresponds a unique pixel beam 20, 30, 40, but a plurality of distinct pixel beams can be supported by a same pupil 24, 34.

An origin O of a coordinate system (x, y, z) in which the parameters of the pixel beam 20, 30, 40 are defined corresponds to the centre of the pupil 24 as shown on FIG. 2, where the z axis defines a direction normal to the surface of the pupil 24, 34.

The parameters $\theta_x$, $\theta_y$, define chief ray directions relative to the entrance of the pupil 24 centre. They depend on the pixel 22 position on the sensor 23 and on the optical elements of the optical system 21. More precisely, the parameters $\theta_x$, $\theta_y$ represent shear angles defining a direction of the conjugate 25 of the pixel 22 from the centre of the pupil 24.

The parameter $z_P$ represents a distance between the waist 45 of the pixel beam 20, 30, 40, or the conjugate 25 of the pixel 22 and the centre of the pupil, along the z axis.

The parameter a represents the radius of the waist 45 of the pixel beam 20, 30, 40.

For optical systems 21 where optical distortions and field curvatures may be modelled, the parameters $z_P$ and a can depend on the parameters $\theta_x$ and $\theta_y$ via parametric functions.

The four parameters $z_P$, $\theta_x$, $\theta_y$, a are related to the pixel 22 and its conjugate 25.

The six complementary pupilar parameters defining a pixel beam 20, 30, 40 are:
- r which represents the pupil 24, 34 radius, $x_O$, $y_O$, $z_O$ which represent the coordinates of the pupil 24, 34 centre in the (x, y, z) coordinate system, and
- $\theta_{x0}$, $\theta_{y0}$ which represent the orientation of the pupil 24, 34 in the reference (x, y, z) coordinate system.

These six pupilar parameters are related to the pupil 24, 34. Another parameter c is defined. Such a parameter c is dependent on the parameters $z_P$ and a related to the pixel 22 and its conjugate 25 and on the parameters r related to the pupil 24, 34. The parameter c defines the angular aperture a of the pixel beam 20, 30, 40 and is given by the formula $$\tan(\alpha) = \frac{a}{c}.$$

Thus the expression of the parameter c is given by the following equation:

$$c^2 = \frac{a^2 z_P^2}{r^2 - a^2} \quad (1)$$

The coordinates (x, y, z), in the object space, of points belonging to the surface delimiting the pixel beam 20, 30, 40 are function of the above defined sets of parameters related to the pupil 24, and to the conjugate 25 of the pixel. Thus, equation (2) enabling the generation of the hyperboloid of one sheet representing the pixel beam 20, 30, 40 is:

$$\frac{(x - z.\tan(\theta_x))^2}{a^2} + \frac{(y - z.\tan(\theta_y))^2}{a^2} - \frac{(z - z_P)^2}{c^2} = 1 \quad (2)$$

A parametric equation (3) of the same hyperboloid representing the pixel beam 20, 30, 40 is:

$$\begin{cases} x = a\sqrt{1 + \frac{(z - z_P)^2}{c^2}} \cdot \cos(v) + z.\tan(\theta_x) \\ y = a\sqrt{1 + \frac{(z - z_P)^2}{c^2}} \cdot \sin(v) + z.\tan(\theta_y) \end{cases} \quad (3)$$

wherein v is an angle in the (x, y) plane enabling the generation of the pixel beam 20, 30, 40 from a generating hyperbola, v varies in [0, 2π] interval, and z∈[0, ∞] is the coordinate along the z axis which defines a direction normal to the surface of the pupil 24, 34. Equations (2) and (3) are written on the assumption that the section of the pixel 22 and its conjugate 25 are circular and that the section of the pupil 24, 34 is circular as well.

In order to obtain a precise description of how the pixel beams 20, 30, 40 sample the object space of the optical system 21, it is interesting to determine how the geometry of the section of the pixel 22 and the section of the pupil 24, 34 paves the object space. This leads to the knowledge of how light emitted in the object space is distributed between the different pixels 22 of the sensor 23.

Another set of parameters is thus defined in order to describe the shape of the sections of the pupil 24, 34 and of the pixel 22 and of the conjugate 25 of the pixel 22.

A first parameter $A_O$ is defined. The parameter $A_O$ represents an aspect ratio to allow for asymmetric pupil 24, 34.

A second parameter $A_P$ is defined. The parameter $A_P$ represents an aspect ratio to allow for asymmetric pixel beams at the conjugate 25, 45 of the pixel 22—the waist.

A third parameter dependent parameter a is defined as follows:

$$\alpha = \left| \frac{1 - \left(\frac{z}{z_P}\right)^k}{1 + \left(\frac{z}{z_P}\right)^k} \right| \quad (4)$$

α is a coefficient which represents the propagation of the pixel beam 20, 30, 40 shape along the z axis between the pupil 24, 34 and the conjugate 25, 45 of the pixel 22, independently from the shape of the sections of the pupil 24, 34 and of the pixel 22; and from the conjugate 25, 45 of the pixel 22 to infinity. The parameter k is a parameter adjusting the evolution of the pixel beam 20, 30, 40 shape along the z axis. A value of k≈1.3 approximates a linear variation of the parameter a between the pupil 24, 34 and the conjugate 25, 45 of the pixel 22.

Two parameters $\rho_O$ and $\rho_P$, called polar radius factors, are describing respectively the shape of the pupil 24, 34 and the shape of the conjugate 25, 45 of the pixel 22. The parameters $\rho_O$ and $\rho_P$ are defined by the following equation:

$$\rho = \min\left(\frac{1}{\text{abs}(\cos(v))}, \frac{1}{\text{abs}(\sin(v))}\right) \quad (5)$$

where ρ is the polar radius defining a unit square point for angle v.

The following table, called table 1, gives examples of the values of parameters $\rho_O$ and $\rho_P$ when $A_O = A_P = 1.0$:

TABLE 1

| $\rho_O$ | $\rho_P$ | |
|---|---|---|
| 1.0 | 1.0 | circular pupil 24, 34 and pixel conjugate 25, 45 |
| 1.0 | ρ | circular pupil 24, 34 and square shape pixel conjugate 25, 45 |
| ρ | 1.0 | square shape pupil 24, 34 and circular pixel conjugate 25, 45 |
| ρ | ρ | square shape pupil 24, 34 and square shape pixel conjugate 25, 45 |

Taking into account the above defined parameters related to the shape of the sections of the pupil 24, 34 and the pixel 22 and the conjugate 25 of the pixel 22, an extended parametric equation (6) of the hyperboloid representing the pixel beam 20, 30, 40 is:

$$\begin{cases} x = a\sqrt{1 + \frac{(z-z_P)^2}{c^2}} \cdot [\alpha.\rho_O + (1-\alpha).\rho_P].\cos(v) + z.\tan(\theta_x) \\ y = a\sqrt{1 + \frac{(z-z_P)^2}{c^2}} \cdot [\alpha.A_O.\rho_O + (1-\alpha).A_P.\rho_P].\sin(v) + z.\tan(\theta_y) \end{cases} \quad (6)$$

Information related to a correspondence between pixels of a sensor of said optical acquisition system and an object space of said optical acquisition system may take the form of either a set of parameters comprising the four parameters: $z_P$, $\theta_x$, $\theta_y$, a defining the position and size of the pixel conjugate 25, 45, in front of the pupil 24, 34 and the six pupilar parameters $x_O$, $y_O$, $z_O$, $\theta_{x0}$, $\theta_{y0}$, r which define the position, orientation and radius of the pupil 24, 34 when the pixel beam is to be represented by its parametric equation. Thus, this set of parameters is provided in addition to raw images or epipolar images representing 4D light-field data captured by the optical acquisition system in order to be used while processing the 4D light-field data.

Those additional information related to pixel beams are metadata associated to a given optical acquisition system. They may be provided as a data file stored for example on a CD-ROM or a flash drive supplied with the optical acquisition system. The data file containing the additional information related to pixel beams may also be downloaded from a server belonging to the manufacturer of the optical acquisition system. In an embodiment of the invention, these additional information related to pixel beams may also be embedded in a header of the images captured by the optical acquisition system.

The knowledge of these information related to pixel beams enables the processing of images captured by any optical acquisition system independently of the proprietary file format and of the features of the optical acquisition system used to capture the images to be processed.

Figure 5:
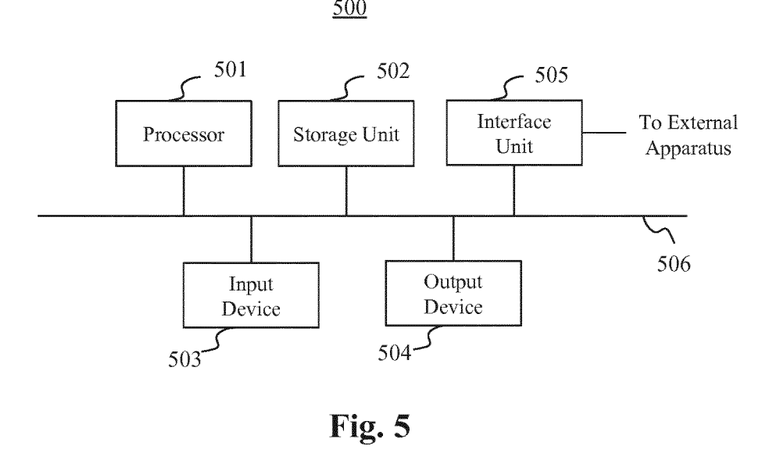
FIG. 5 is a schematic block diagram illustrating an example of an apparatus for generating data representing a pixel beam according to an embodiment of the present disclosure.

FIG. 5 is a schematic block diagram illustrating an example of an apparatus for encoding an image captured by an optical acquisition system according to an embodiment of the present disclosure. Such an apparatus may be an optical acquisition system such as a camera.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program capable of encoding an image acquired by the optical acquisition system to be executed by the processor 501, and various data, including parameters related to a position of the pixel 22 on the sensor 23, a position of the pupil or parameters related to the optical system 21 of the optical acquisition system, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for computing parameters representing a volume occupied by a set of rays of light in an object space of an optical system and encoding these parameters with an image captured by the optical acquisition system according to an embodiment of the present disclosure as described hereinafter with reference to FIG. 6.

The input device 503 may be formed by a keyboard, a pointing device such as a mouse, or the like for use by the user to input commands, to make user's selections of parameters used for generating a parametric representation of a volume occupied by a set of rays of light in an object space of an optical system. The output device 504 may be formed by a display device to display, for example, a Graphical User Interface (GUI), images generated according to an embodiment of the present disclosure. The input device 503 and the output device 504 may be formed integrally by a touch-screen panel, for example.

The interface unit 505 provides an interface between the apparatus 500 and an external apparatus. The interface unit 505 may be communicable with the external apparatus via cable or wireless communication. In an embodiment, the external apparatus may be optical acquisition system, such as a camera, a smartphone, a tablet, etc.

Figure 6:
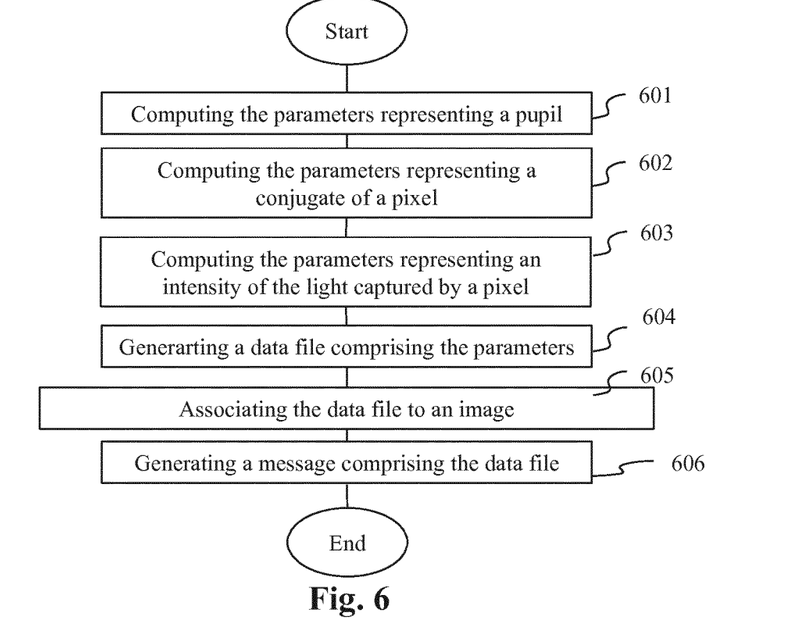
FIG. 6 is a flow chart for explaining a process for generating data representing a pixel beam according to an embodiment of the disclosure.

FIG. 6 is a flow chart for explaining a process for generating data representative of a pixel beam of according to an embodiment of the disclosure.

The processor 501 of the apparatus 500 executes the program capable of computing parameters representing the pixel beams belonging to a collection of pixel beams of the optical acquisition system and encoding these parameters with an image captured by the optical acquisition system.

Thus, the processor 501 computes, during a step 601 the six pupilar parameters $x_O$, $y_O$, $z_O$, $\theta_{x0}$, $\theta_{y0}$, r which define the position, orientation and radius of the pupil 24, 34. This step 601 is executed for each pupil 24 of the optical acquisition system and each pixel 22 of the sensor 23.

This computation is realized for example during a calibration phase of the optical acquisition system by running a program capable of modelling a propagation of rays of light through the optical system 11. Such a program is for example an optical design program such as Zemax©, ASAP© or Code V©. An optical design program is used to design and analyze optical systems 11. An optical design program models the propagation of rays of light through the optical system 11; and can model the effect of optical elements such as simple lenses, aspheric lenses, gradient index lenses, mirrors, and diffractive optical elements, etc. A library of commercial lenses is store in the storage unit 502 of the apparatus 500 and is accessible to the processor 501 when it executes the optical design program.

During a step 602, the processor 501 computes the four parameters: $Z_P$, $\theta_x$, $\theta_y$, a defining the position and size of the pixel conjugate 25, 45, in front of the pupil 24, 34. This computation is based on the parameters defining a pupil 24, 34 computed during step 601 and parameters defining a position of the pixel 22 on the sensor 23 stored in the storage unit 502 of the apparatus 500. This computation is realized the calibration phase of the optical acquisition system by running a program capable of modelling a propagation of rays of light through the optical system 11 as well. Step 602 is executed for each pixel 22 of the sensor 23.

During a step 603, the processor 501 computes, from light field data captured by the optical acquisition device, the parameters representing the intensity of the light captured by a pixel 22 of the sensor 23. Depending on the type of sensor 23, the parameters representing the intensity of the light captured by the pixel 22 are for example a color channel attribute such as R, G or B or a combination RGB thereof or a luminance attribute L or an infra-red attribute IR, etc.

In a step 604, the processor 501 generates a digital file comprising the parameters defining the pupils 24, 34 of the optical acquisition system and associated to each pupils the parameters defining the conjugates 35 of the pixels 22 which define, with the pupil, a pixel beam. The parameters representing the intensity of the light captured by the pixel 22 which conjugate 35 defines the pixel beam are associated to the parameters defining the pupil 24, 34. The generated data file is stored for example on a CD-ROM or a flash drive supplied with the optical acquisition system or on a server belonging to the manufacturer of the optical acquisition system.

Figure 7:
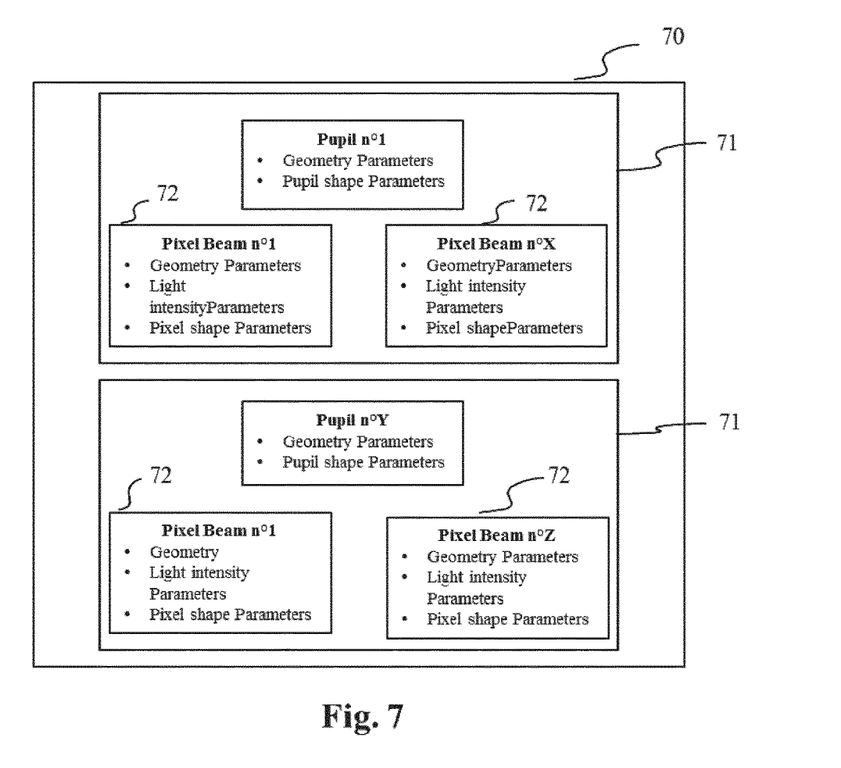
FIG. 7 represents a digital file generated according to the process for generating data representing a pixel beam according to an embodiment of the disclosure.

Such a digital file 70 is represented on FIG. 7. The digital file 70 represents the collection of pixel beams of an optical acquisition system such as a camera. Each pupil 1 to Y corresponds to a microlens of the camera when the camera is a plenoptic camera or to the lenses of the different cameras in the case of camera arrays.

A field 71 of the digital file 70 is dedicated to each pupil 1 to Y of the camera. In this field all the parameters related to the considered pupil are stored such as the six pupilar parameters $x_O$, $y_O$, $z_O$, $\theta_{xO}$, $\theta_{yO}$, r which define the position, orientation and radius of the pupil, a parameter $A_O$ representing an aspect ratio to allow for asymmetric pupil and a parameter $\rho_O$ called polar radius factor describing the shape of the pupil.

In each field dedicated to a pupil 1 to Y, parameters related to the pixel beams 1 to X defined by said pupil are stored in dedicated sub-fields 72. In these sub-fields 72 are stored the four parameters: $Z_P$, $\theta_x$, $\theta_y$, a defining the position and size of the pixel conjugate 25, 45, in front of the pupil 24, 34, a parameter $A_p$ representing an aspect ratio to allow for asymmetric pixel and a parameter $\rho_p$ called polar radius factor describing the shape of the pixel and the parameters representing an intensity of the light captured by a pixel the conjugate of which defines the pixel beam.

In an embodiment of the invention, the digital file 70 comprises parameters defining the pupils and the conjugates of pixels of at least two different optical acquisition devices. Each optical acquisition device is characterized by extrinsic parameters such as a 3×3 rotation matrix and a 3×1 translation vector, both rotation matrix and translation vector being obtained by an extrinsic calibration of the acquisition devices.

In another embodiment of the invention, during a step 605, the processor 501 associates the digital file comprising the parameters representing the pixel beams associated to the different pixels of the sensor of the optical acquisition system to an image captured by the optical acquisition system. The data file is for example stored in a specific field of a header of the captured images.

During a step 606, the processor 501 generates a message to be sent to an apparatus capable of processing an image captured by the optical acquisition system. In a first embodiment of the invention, the message comprises the data file comprising the computed parameters representing the pixel beams associated to the different pixels of the sensor of the optical acquisition system to an image captured by the optical acquisition system. In a second embodiment of the invention, the message consists in an image captured by the optical acquisition system embedding the data file in a field of its header.

This message is then transmitted through the interface unit 505 to an external apparatus. The interface unit 505 transmits a signal to the external apparatus via cable or wireless communication carrying the message comprising the parameters. The external apparatus is capable of processing an image captured by the optical system 21 using the parameters received in the message transmitted by the apparatus 500.

Figure 8:
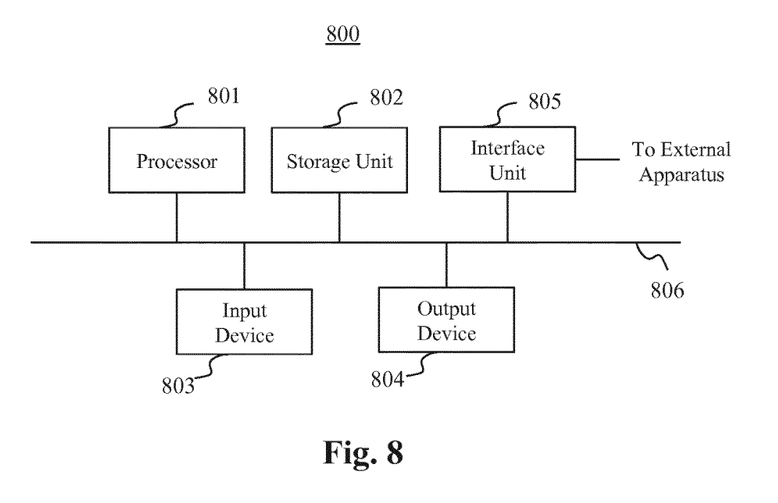
FIG. 8 is a schematic block diagram illustrating an example of an apparatus for processing an image captured by an optical acquisition system according to an embodiment of the present disclosure.

FIG. 8 is a schematic block diagram illustrating an example of an apparatus for processing an image captured by an optical acquisition system according to an embodiment of the present disclosure.

The apparatus 800 comprises a processor 801, a storage unit 802, an input device 803, a display device 804, and an interface unit 805 which are connected by a bus 806. Of course, constituent elements of the computer apparatus 800 may be connected by a connection other than a bus connection.

The processor 801 controls operations of the apparatus 800. The storage unit 802 stores at least one program capable of processing an image acquired by the optical acquisition system to be executed by the processor 801, and various data, including parameters related to a position of the pixel 22 on the sensor 23 or parameters related to the optical system 21 of the optical acquisition system, parameters used by computations performed by the processor 801, intermediate data of computations performed by the processor 801, and so on. The processor 801 may be formed by any known and suitable hardware, or software, or a combination of hardware and software. For example, the processor 801 may be formed by dedicated hardware such as a processing circuit, or by a programmable processing unit such as a CPU (Central Processing Unit) that executes a program stored in a memory thereof.

The storage unit 802 may be formed by any suitable storage or means capable of storing the program, data, or the like in a computer-readable manner. Examples of the storage unit 802 include non-transitory computer-readable storage media such as semiconductor memory devices, and magnetic, optical, or magneto-optical recording media loaded into a read and write unit. The program causes the processor 801 to perform a process for processing an image captured by the optical acquisition system based on the parameters of the pixel beams provided with the image to be processed according to an embodiment of the present disclosure as described hereinafter with reference to FIG. 9.

The input device 803 may be formed by a keyboard, a pointing device such as a mouse, or the like for use by the user to input commands, to make user's selections of parameters used for processing the image captured by the optical acquisition system. The output device 804 may be formed by a display device to display, for example, a Graphical User Interface (GUI), images generated according to an embodiment of the present disclosure. The input device 803 and the output device 804 may be formed integrally by a touchscreen panel, for example.

The interface unit 805 provides an interface between the apparatus 800 and an external apparatus. The interface unit 805 may be communicable with the external apparatus via cable or wireless communication. In an embodiment, the external apparatus may be optical acquisition system or the apparatus 600.

Figure 9:
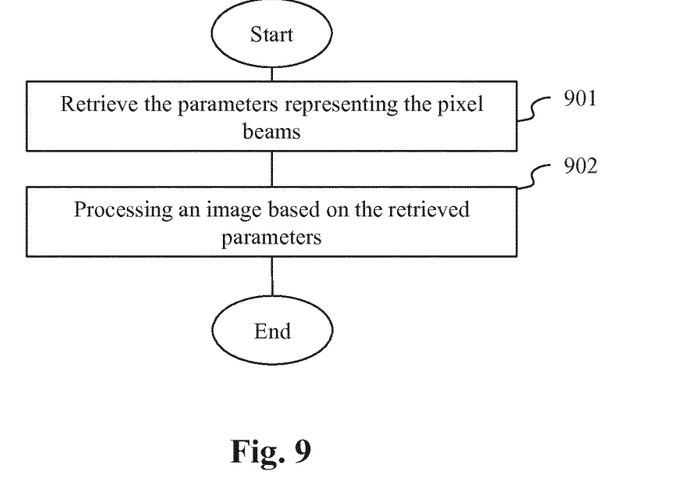
FIG. 9 is a flow chart for explaining a process for processing an image captured by the optical acquisition system according to an embodiment of the disclosure.

FIG. 9 is a flow chart for explaining a process for processing an image captured by the optical acquisition system according to an embodiment of the disclosure.

The processor 801 of the apparatus 800 executes the program capable of processing an image captured by the optical acquisition system based on the parameters representing a pixel beam associated with the image to be processed.

Thus, the processor 801, during a step 901, retrieves the parameters representing the pixel beams that are to be used to process the captured image either from a CD-ROM or a flash drive supplied with the optical acquisition system or by downloading the data file comprising said parameters from a server belonging to the manufacturer of the optical acquisition system. In an embodiment of the invention, the processor 801 retrieves these parameters in the header of the image to be processed.

Then, during a step 902, processes, during a step 901, the image captured by the optical acquisition system based on the parameters representing the pixel beams 10, 20, 30, 40, 50 retrieved during step 901.

The processing of the captured image may consists in de-multiplexing, de-mosaicking, refocusing, rendering or mixing said captured image with at least another image captured by a different optical acquisition system, or a combination of any of these actions.

Although the present invention has been described hereinabove with the reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method comprising:
generating data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, and
generating a digital file comprising the data representative of said pixel beam, said data comprising:
parameters defining said pupil of the optical acquisition device,
parameters defining the smallest section of said pixel beam, called the waist, which corresponds to the conjugate, in the object space, of at least said pixel of the sensor, wherein said parameters defining the waist of said pixel beam are computed based on parameters defining said at least one pixel, and the parameters representing the waist of the pixel beam comprise a distance between the waist of the pixel beam and the center of the pupil, and an orientation of the waist of the pixel beam in a coordinate system associated to the optical acquisition system.

2. The method according to claim 1 wherein parameters representing an intensity of the light captured by said pixel obtained from light field data captured by the optical acquisition system, are associated to the parameters representative of the pixel beam in said digital file.

3. The method according to claim 2 wherein the parameters defining the pupil comprise a radius of the pupil, coordinates of the pupil center in the coordinate system associated to the optical acquisition system, and angles defining an orientation of the pupil in said coordinate system.

4. An apparatus comprising:
at least one processor configured to:
generate data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, and
generate a digital file comprising the data representative of said pixel beam, said data comprising:
parameters defining said pupil of the optical acquisition device,
parameters defining the smallest section of said pixel beam, called the waist, which corresponds to the conjugate, in the object space, of at least said pixel of the sensor, wherein said parameters defining the waist of said pixel beam are computed based on parameters defining said at least one pixel, and the parameters representing the waist of the pixel beam comprise a distance between the waist of the pixel beam and the center of the pupil, and an orientation of the waist of the pixel beam in a coordinate system associated to the optical acquisition system.

5. The apparatus according to claim 4 wherein parameters representing an intensity of the light captured by said pixel obtained from light field data captured by the optical acquisition device, are associated to the parameters representative of the pixel beam in the digital file.

6. The apparatus according to claim 5 wherein the parameters defining the pupil comprise a radius of the pupil, coordinates of the pupil center in the coordinate system associated to the optical acquisition device, and angles defining an orientation of the pupil in said coordinate system.

7. A light field imaging device comprising:
an array of micro lenses arranged in a regular lattice structure;
a photosensor configured to capture light projected on the photosensor from the array of micro lenses, the photosensor comprising sets of pixels, each set of pixels being optically associated with a respective micro lens of the array of micro lenses; and
at least one processor configured to provide a digital file comprising data representative of a volume, in an object space of an optical acquisition system, occupied by a set of rays of light passing through a pupil of said optical acquisition system and a conjugate of at least one pixel of a sensor of said optical acquisition system, said volume occupied by said set of rays of light being called a pixel beam, wherein the data representative of the pixel beam comprises:
parameters defining said pupil of the optical acquisition device,
parameters defining the smallest section of said pixel beam, called the waist, which corresponds to the conjugate, in the object space, of at least said pixel of the sensor, wherein said parameters defining the waist of said pixel beam are computed based on parameters defining said at least one pixel, and the parameters representing the waist of the pixel beam comprise a distance between the waist of the pixel beam and the center of the pupil, and an orientation of the waist of the pixel beam in a coordinate system associated to the optical acquisition system.

8. The light field imaging device of claim 7, wherein the data representative of the pixel beam further comprises parameters representing an intensity of the light captured by said pixel.

9. The light field imaging device of claim 8, wherein the parameters defining the pupil comprise a radius of the pupil, coordinates of the pupil center in a coordinate system associated to the optical acquisition device, and angles defining an orientation of the pupil in said coordinate system.

10. A device for rendering an image from light field data comprising:
at least one processor configured to
obtain a digital file comprising data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, and
process the light field data based on the data in the digital file to render the image, wherein the data representative of the pixel beam comprises
parameters defining said pupil of the optical acquisition device,
parameters defining the smallest section of said pixel beam, called the waist, which corresponds to the conjugate, in the object space, of at least said pixel of the sensor,
wherein said parameters defining the waist of said pixel beam are computed based on parameters defining said at least one pixel, and the parameters representing the waist of the pixel beam comprise a distance between the waist of the pixel beam and the center of the pupil, and an orientation of the waist of the pixel beam in a coordinate system associated to the optical acquisition system.

11. The device of claim 10, wherein the data representative of the pixel beam further comprises parameters representing an intensity of the light captured by said pixel.

12. The device of claim 11, wherein the parameters defining the pupil comprise a radius of the pupil, coordinates of the pupil center in a coordinate system associated to the optical acquisition device, and angles defining an orientation of the pupil in said coordinate system.

13. A non-transitory computer readable medium storing program instructions that, when executed by a processor, generate a digital file comprising data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, said data comprising:
parameters defining said pupil of the optical acquisition device,
parameters defining the smallest section of said pixel beam, called the waist, which corresponds to the conjugate, in the object space, of at least said pixel of the sensor, wherein said parameters defining the waist of said pixel beam are computed based on parameters defining said at least one pixel, wherein the parameters representing the waist of the pixel beam comprise a distance between the waist of the pixel beam and the center of the pupil, and an orientation of the waist of the pixel beam in a coordinate system associated to the optical acquisition system, and
an intensity of the light captured by said pixel obtained from light field data captured by the optical acquisition system.

* * * * *